United States Patent [19]

Browning

[11] Patent Number: 5,711,795
[45] Date of Patent: Jan. 27, 1998

[54] COMPRESSIBLE AND MOLDABLE TOY SAND COMPOSITION

[75] Inventor: James D. Browning, Columbus, Ohio

[73] Assignee: Battelle Memorial Institute, Columbus, Ohio

[21] Appl. No.: 702,786

[22] Filed: Aug. 23, 1996

[51] Int. Cl.$^6$ .............................. L08L 91/06; L08L 91/08
[52] U.S. Cl. ............................................ 106/271; 106/272
[58] Field of Search ...................................... 106/271, 272

[56] References Cited

U.S. PATENT DOCUMENTS

| | | | |
|---|---|---|---|
| 244,321 | 7/1881 | Sellars | 106/272 |
| 525,292 | 8/1894 | Slicer | 106/272 |
| 4,925,493 | 5/1990 | Lamoreaux | 106/272 |

OTHER PUBLICATIONS

CA 72:82032, Ahlert et al., "Molding composition", Jan. 1970.

Color Index: Second Edition (1956), vol. 2, The Soc. of Dyers and Colourists, England, The Amer. Assoc. of Textile Chemists and Colorists, Massachusetts, "Pigments," pp. 2697–2699, and Solvent Dyes, pp. 2815–2816.

Kirk–Othmer, Encyclopedia of Chemical Technology, 3rd Ed., vol. 24, "Waxes," pp. 466–481 no month available.

Encyclopedia of Polymer Science and Engineering, vol. 17, "Waxes," pp. 784–795 no date available.

*Primary Examiner*—David Brunsman
*Attorney, Agent, or Firm*—Wood, Herron & Evans, L.L.P.

[57] ABSTRACT

A sand-based molding composition which can be compressed using hand pressure, and which starts as a free-flowing sand mixture, is formed by combining a solvent with a waxy binder and blending this with sand and subsequently stripping off the solvent. The molding composition includes the particulate material, preferably sand, coated with a thin coating of the waxy binder which is preferably a paraffin wax. A pigment can be added which will remain held by the binder and will not tend to stain. The molding composition can be compressed with the hand to form a molded article, and can be easily crushed to form a flowable, sandy product.

17 Claims, No Drawings

COMPRESSIBLE AND MOLDABLE TOY SAND COMPOSITION

BACKGROUND OF THE INVENTION

Children of all ages love to play with sand. One of the most enjoyable things to do with sand is to make a sand castle or other building out of sand. Sand mixed with the right amount of water can be compressed together to form a self-sustaining structure. Of course, when the sand dries it crumbles apart. Unfortunately, sand does not make a good plaything for inside the house. It is simply too messy.

There are many molding compositions that can be used inside the house such as putty-type molding compositions and Play Doh® brand molding composition, but these do not have the overall feeling of sand. They frequently tend to dry out and are too expensive to make larger items.

SUMMARY OF THE INVENTION

The present invention is premised upon the realization that a low-cost, compressible molding composition can be formed by coating inert particulate material with an inert wax-like material. Preferably, according to the present invention, the compressible molding composition comprises sand or other particulate material coated with a thin coating of wax, preferably a paraffin wax or similar composition. The formed product requires no water for compression molding and is very clean, leaving little or no residue on the hands. It is tactilely pleasant, non-toxic and safe. Further, it can be combined with food-grade or other inert pigment compositions to provide a colored molding composition. Further, the pigments can be fluorescent or phosphorescent, which in turn provides for a wide variety of different aesthetic appearances which further enhances the product.

The objects and advantages of the present invention will be further appreciated in light of the following detailed description.

DETAILED DESCRIPTION

According to the present invention, a compressible molding composition includes a particulate material coated with a wax-like binder. This composition can be pressed together with one's hands to form a self supporting article.

The particulate material employed in this composition can be any inert particulate material. Preferably, it will be a non-porous inert material. The preferred particulate material is an inorganic material such as sand, crushed stone, silica particles or other crushed minerals. Silicaceous materials are particularly suitable. Such particles are inert, non-hazardous. The preferred particulate material is sand, due to its overall size, porosity, inertness and cost.

The particle sizes of the particulate material can vary widely, generally from 1000 down to 50 microns. Preferred particle sizes would be from about 500 down to about 100 microns. Sand or ground stone or other siliceous material can be purchased having such a particle size.

The particulate material is coated with a film of a binder. The binder is an inert, wax-like material which will bind to the particulate material and will not dry out. Preferably, the binder is a wax. The term "wax" is used as a generic classification of many materials that are either natural or synthetic and of petroleum, mineral, vegetable, or animal origin. Generally, these materials are considered wax-like because of their functional characteristics and physical properties. They are solid at ambient temperatures with a relatively low melting point, and capable of softening when heated and hardening when cooled. The material is self-adherent and thus functions as a binder. Further, it is deformable under moderate pressure. Compositions generally included within the definition of wax include waxes of vegetable and animal origin such waxes include beeswax. Also included within the term "wax" is paraffin wax which is a distillate taken from petroleum after the cracking process. Other wax-like materials include low molecular weight polyethylenes and polymethylenes, as well as wax-like polyethylene glycol. However, paraffin wax which is obtained from petroleum distillation is preferred.

Preferably, the binder is one which has a melting point significantly above room temperature and generally greater than 100° F. or more. Microcrystalline wax and Borneo wax have relatively high melting points—145°–165° F. Other waxes that have particularly high melting points include Montan wax which melts at 80°–90° C.

In order to formulate the molding composition of the present invention, the binder or wax is dissolved or suspended in a solvent, preferably an inert, organic solvent. Suitable solvents would include isopropyl alcohol, hexane, heptane, nonane, chloroform and toluene. With water-emulsified waxes, of course, water can be used. But this is more difficult to remove from the end product and therefore is less preferred. Generally, the hydrocarbon solvents are preferred. The wax or binder is combined with the solvent to form a nearly saturated solution of the wax. This is then combined with the particulate material and mixed. The solvent is then stripped, leaving the molding composition remaining.

Generally, the particulate material will form the bulk of the product by weight. Generally, the binder will be from about 1.5% to about 15% of the molding composition (with the solvent stripped), and preferably will be about 2.5% to 7.5% of the overall composition. Thus, for example, 20 gm of paraffin may be combined with 375 gm of sand to form the composition.

Generally, the solvent will form 25% to 50% by weight or more of the total combined weight of the wax, sand and solvent. Basically, as little solvent should be used as possible to provide a coating. In forming the coating, the solvent is simply combined with the wax and heated to ensure complete dissolution. Optimally a non-saturated solution is obtained. This is then added to the sand and combined in an appropriate blender such as a rotary blender, ribbon blender or the like.

In addition, any pigment can be combined with the sand composition. Generally, these should be pigments considered safe for toys such as those certified by the Art and Creative Materials Institute. The pigment can be a visible color pigment or a fluorescent pigment, a phosphorescent pigment or even a thermochromic pigment, depending upon the desired aesthetic appearance of the final product. The amount of pigment will vary, depending on the pigment and the desired color, but will generally be 0.1% to 50% based on sand or inert material. In addition to pigment, other colorants such as glitter or mica particles can be added.

The blending is continued until there is even mixing, and then the solvent is removed using a rotary evaporator. Care must be taken that the rotary evaporator does not increase the temperature of the molding composition above the melting point of the binder or an agglomerated semi-solid product will be formed.

The product is then ready for use. It can be held in the hand and compressed by applying only hand pressure, which would be about 0.5 or greater lbs/inch$^2$, to form a self-sustaining molded article. Open molds can also be used to form molded products. The products can also be run through a toy extruder, providing for a variety of different play activities. After it has been molded, it can be broken up by light hand pressure and reused.

If desired, the molded article or object can be made semi-permanent by heating it, in a conventional oven, to the melting point of the wax. This temperature is simply held until the wax throughout the molded object becomes molten, generally about 1–30 minutes. When cooled, the object hardens and becomes less friable. It can then be painted, if desired, to enhance the aesthetics of the object.

The invention will be further appreciated in light of the following detailed examples which demonstrate the formulation of the product, as well as various modifications.

EXAMPLE 1

A moldable sand composition is formed by first making a sand/wax solution according to Step 1.0 and then removing the solvent as per Step 2.0.

Step 1.0 Make Wax/Sand Solution 1.1 Add 400 mls of Hexane to 1000 ml round bottom flask 1.2 Add 20 grams of paraffin wax (prepared by grating through cheese grater)

1.3 Drop in magnetic stirbar and turn on magnetic stirrer 1.4 If wax dissolves slowly, heat gently with heating mantle (40° to 50° C.)

1.5 Add 1.5 grams of pigment through funnel while stirring 1.6 Turn off magentic stirrer and remove magnetic stirbar 1.7 Add 375 grams of white play sand through a funnel, vortexing solution by hand 1.8 Cap and shake to ensure sand is completely coated with solution Step 2.0 Solvent Removal 2.1 Attach flask to Rotavap, bath temperature –56° C., RPM=40, water aspirator for vacuum 2.2 Remove solvent for about 30 minutes. Continue under same conditions another 30 minutes to dry sand as much as possible and remove residual solvent 2.3 Remove flask from Rotavap and place contents into Pyrex dish in fume hood to allow trace solvent to evaporate 2.4 After contents are completely dry, break up any clumps by hand and store in a polyethylene bottle Following the procedure disclosed in Example 1, various ratios of paraffin to particulate matter loadings were evaluated. The components, volumes and percent ratios are provided in Table 1. The data in Table 1 would indicate that the optimum ratio of wax to sand+wax on a percent basis is 2.5 to about 5.0%.

A variety of different solvents were evaluated and the results of these evaluations are shown in Table 2. As can be seen from the data in Table 2, althougth isopropyl alcohol and chloroform both work well with paraffin as a binder, heptane and hexane are more desirable.

Various waxes and other binders were further evaluated. The results of these evaluations are shown in Table 3. Paraffin and microcrystalline paraffin work nearly equally as well. Other waxes tested also worked to varying degrees, but tend to produce a less desirable product. Other animal, mineral, vegetable and synthetic waxes should provide similar efficacy. In these tests, the Vanwax-H is a blend of paraffin wax and microcrystalline paraffin wax, petroleum based, with an average molecular weight of 600–800 and 30–75 carbon atoms per molecule. The paraffin is a semi-microcrystalline paraffin, normal paraffin having a molecular weight of 280–560 with 20–40 carbon atoms per molecule.

In order to determine the optimal solvent concentration, various solvent concentrations were used employing hexane as the solvent. Sufficient solvent is present when it solubilizes the wax. Ideally, processing performed utilizing the least volume of solvent per batch minimizes fire hazards and processing costs. The results of these tests are shown in Table 4. The preferred solvent weight percent is between about 27% and 50%, based on the combined solvent, wax and particulate matter where the particulate matter was sand.

Pigmentation of the system was investigated using combinations of various binders, solvents and pigments. The different components are shown in Table 5. The product incorporating the binder and the pigment surprisingly retained its pigmentation and did not bleed off into other products.

Further, to evaluate the particle size requisites for practicing the present invention, various compositions were employed. These are shown in Table 6. In the first experiment, the sand particles had a size greater than 425 microns. In the second experiment, the sand particles were about 250 microns, and in the third experiment, the sand particles were 150 microns. All worked well. Thus, significantly larger and smaller particles can function in the present invention.

Finally, Table 7 shows a variety of different specialty formulations. This shows the use of thermochromic pigments in one formulation, phosphorescent pigments in another, and the incorporation of glitter in the third. These are just variations of formulations which demonstrate the variety of effects that can be achieved using the present invention.

TABLE 1

OPTIMIZATION OF PARAFFIN TO WAX LOADING

| Ingredient | Wt./Vol. (grams/mL) | % Ratio (wax/sand + wax) | Bath temp (C) | Extrac. Time (minutes) | Time Air Dried (hours) | Free Flowing | Compress-bility | Shape Sustainability | Tactility | Comments |
|---|---|---|---|---|---|---|---|---|---|---|
| Paraffin | 10 | 2.5 | 68 | 60 | 24 | yes | good | good | pleasant/soft | |
| Hexane | 400 | | | | | | | | | |
| Sand | 372 | | | | | | | | | |
| Paraffin | 20 | 5 | 58–60 | 60 | 24 | yes | good | good | pleasant/soft | |
| Hexane | 400 | | | | | | | | | |
| Sand | 375 | | | | | | | | | |
| Paraffin | 30 | 7.5 | 59 | 60 | 24 | yes | good | good best | slightly coarse | Tends to clump too much |
| Hexane | 400 | | | | | | | | | |
| Sand | 375 | | | | | | | | | |

TABLE 2

EVALUATION OF SOLVENTS

| Ingredient | Wt./Vol. (grams/mL) | % Ratio (wax/sand + wax) | Bath temp (C) | Extrac. Time (minutes) | Time Air Dried (hours) | Free Flowing | Compressibility | Shape Sustainability | Tactility | Comments |
|---|---|---|---|---|---|---|---|---|---|---|
| Paraffin | 20 | 2.6 | 70 | 60 | 24 | yes | slight | marginal–unacceptable | poor | leaves residual wax feel on hands |
| IPA | 200 | | | | | | | | | |
| Sand | 375 | | | | | | | | | |
| Paraffin | 20 | 5 | 56–60 | 60 | 24 | yes | good-with more force | acceptable | poor | leaves residual wax feel on hands |
| IPA | 200 | | | | | | | | | |
| Sand | 375 | | | | | | | | | |
| Paraffin | 14 | 7 | 61 | 60 | 24 | yes | good | fair | good | does not bind as well as others |
| Chloroform | 350 | | | | | | | | | |
| Sand | 186 | | | | | | | | | |
| Paraffin | 20 | 5 | 56 | 60 | 24 | yes | excellent with little pressure | good | very soft | one of the best |
| Heptane | 400 | | | | | | | | | |
| Sand | 375 | | | | | | | | | |
| Paraffin | 20 | 5 | 48–60 | 60 | 24 | yes | good | good | pleasant/soft | |
| Hexane | 400 | | | | | | | | | |
| Sand | 375 | | | | | | | | | |

TABLE 3

EVALUATION OF WAXES

| Ingredient | Wt./Vol. (grams/mL) | % Ratio (wax/sand + wax) | Bath Temp (C) | Extrac. Time (minutes) | Time Air Dried (hours) | Free Flowing | Compressiblity | Sustainability | Tactility | Comments |
|---|---|---|---|---|---|---|---|---|---|---|
| Sand | 15 | 7.69 | 35 | 60 | 1 | yes | good | good | pleasant/soft | initial experiment |
| Ether | 100 | | | | | | | | | |
| Vanwax-H (microcrystalline) | 1.25 | | | | | | | | | |
| Paraffin | 10 | 2.5 | 68 | 60 | 24 | good | good | good | pleasant/soft | good |
| Hexane | 400 | | | | | | | | | |
| Sand | 375 | | | | | | | | | |
| Vanwax-H (microcrystalline) | 10 | 2.5 | 68 | 60 | 1 | yes | good | | dry hard feel | slumps more than paraffin initially, but breaks up readily; seems to work/feel better at lower temp W/ether |
| Hexane | 400 | | | | | | | | | |
| Sand | 375 | | | | | | | | | |
| Epolene Wax (C-10) | 20 | 5 | 69 | 45 | 24 | yes | no | none/slight | dry | may work out of higher boiling solvent, wax softens at 74–84° C., has odor |
| Hexane | 400 | | | | | | | | | |
| Sand | 375 | | | | | | | | | |
| Carbowax (polyethylene glycol 8000) | 20 | 5 | 55 | 60 | 24 | yes | somewhat | marginal | does not feel as good as paraffin | has an odor, attempted set structure in microwave; no chg. after 5–6 min. of heating |
| Water | 400 | | | | | | | | | |
| Sand | 0 | | | | | | | | | |
| Carbowax (polyethylene glycol 8000) | 20 | 5 | 80 water difficult to strip | 120 | 24 | yes, but clumpy | no | none | unpleasant and clumpy, very coarse and hard | bottom ¼ hard and clumpy; this is area of greatest heat; above MP of wax (~63° C.) |
| Water | 400 | | | | | | | | | |
| Sand | 375 | | | | | | | | | |
| 110 MPX8-Wax (60% wax in emulsion) | 66 | 9.6 | not stripped by Rotovap | not acceptable | 72 @ 40° C. | yes | yes, but requires greater hand pressure, would not work for kids | weak, but works | acceptable, but has odor | bulk mix dumped in Pyrex dish, placed at 45 to remove excess wax and water and oven dried to remove remaining water-could work if wax doubled |
| Additional water | 133 | | | | | | | | | |
| Sand | 375 | | | | | | | | | |
| Beeswax | 20 | 5 | 56 | 60 | 24 | yes, but a little clumpy | yes | good | slightly sticky | honey-like odor, reduced wax loading would improve product performance |
| Hexane | 400 | | | | | | | | | |
| Sand | 375 | | | | | | | | | |

TABLE 4

EVALUATION OF WAXES

| Ingredient | Wt./Vol. (grams/mL) | % Ratio (wax/sand + wax) | Bath temp (C) | Extrac. Time (minutes) | Time Air Dried (hours) | Free Flowing | Compress-ibility | Shape Sustainability | Tactility | Comments |
|---|---|---|---|---|---|---|---|---|---|---|
| Paraffin | 20 | 5 | 58–60 | 60 | 24 | yes | good | good | pleasant/soft | |
| Hexane | 400 | | | | | | | | | |
| Sand | 375 | | | | | | | | | |
| Paraffin | 20 | 5 | 55–57 | 50 | 24 | yes, but a little clumpy | yes | better than IPA | not as soft, coarse feeling | appearance slightly white |
| Hexane | 125 | | | | | | | | | |
| Sand | 375 | | | | | | | | | |
| Paraffin | 20 | 5 | 55–57 | 66 | 24 | yes | good | good | pleasant/soft crunchy initially | |
| Hexane | 150 | | | | | | | | | |
| Sand | 375 | | | | | | | | | |

TABLE 5

COLORING/PIGMENTING OF PARAFFIN SYSTEM WITH FLUORESCENT PIGMENTS

| Ingredient | Wt./Vol. (grams/mL) | % Ratio (wax/sand + wax) | Bath Temp (C) | Extrac. Time (minutes) | Time Air Dried (hours) | Free Flowing | Compress-ibility | Shape Sustain-ability | Tactility | Comments |
|---|---|---|---|---|---|---|---|---|---|---|
| Vanwax-H | 4.95 | 6.2 | 58 | 60 | 24 | yes | yes | yes | a little coarse, more like coarse sand instead of fine | agglomerated initially, but broke up to decent product, colorfast fluorescent |
| Chloroform | 75 | | | | | | | | | |
| Sand | 70 | | | | | | | | | |
| F5-605 purple | 0.05 | | | | | | | | | |
| Paraffin | 20 | N/A | 58–60 | 60 | 24 | yes | good | good | pleasant/soft | |
| Hexane | 400 | | | | | | | | | |
| FB-205 yellow pigment | 1.5 | | | | | | | | | |
| Sand | 375 | | | | | | | | | |
| Paraffin | 20 | 5 | 58 | 60 | 24 | yes | yes, compresses easily | yes | good | nice vivid color, colorfast, fluorescent |
| Hexane | 400 | | | | | | | | | |
| Sand | 375 | | | | | | | | | |
| FB-605 violet | 1.5 | | | | | | | | | |
| No Paraffin | 0 | 0 | 58 | 60 | 24 | yes | no | none | sharp, sand-like | appears to be colorfast, but some pigment comes off on hands, fluorescent |
| Hexane | 100 | | | | | | | | | |
| Sand | 93.75 | | | | | | | | | |
| FB-605 violet | 0.375 | | | | | | | | | |
| Paraffin | 20 | 5 | 58 | 60 | 24 | yes | yes | good | soft, pleasant | colorfast, nice color, fluorescent |
| Hexane | 400 | | | | | | | | | |
| Sand | 375 | | | | | | | | | |
| FB-805 blue | 1.5 | | | | | | | | | |
| Paraffin | 20 | 5 | 58 | 60 | 24 | yes | yes | good | soft, pleasant | colorfast, vivid color, looks good, fluorescent |
| Hexane | 300 | | | | | | | | | |
| Sand | 375 | | | | | | | | | |
| FB-905 green | 1.5 | | | | | | | | | |
| Paraffin | 20 | 5 | 58 | 60 at 20–23" Hg. | 24 | yes | yes | good | soft, pleasant | colorfast, vivid color, fluorescent, reduced pigment may be better |
| Hexane | 400 | | | | | | | | | |
| Sand | 375 | | | | | | | | | |
| FB-805 blue | 1.5 | | | | | | | | | |

TABLE 6

EVALAUTION OF VARIOUS PARTICLE SIZES

| Ingredient | Wt./Vol. (grams/mL) | % Ratio (wax/sand + wax) | Bath Temp (C) | Extrac. Time (minutes) | Time Air Dried (hours) | Free Flowing | Compressibility | Shape Sustainability | Tactility | Comments |
|---|---|---|---|---|---|---|---|---|---|---|
| | | | | >425 micron large sand: | | | | | | |
| Paraffin | 20 | 5 | 56 | 55 | 24 | yes | good | good | like beach sand, slightly coarse and sharp | |
| Hexane | 400 | | | | | | | | | |
| Sand | 375 | | | | | | | | | |
| | | | | <250 microns medium sand similar to white play sand: | | | | | | |
| Paraffin | 20 | 5 | 58 | 60 | 24 | yes | good | good | soft, pleasant | |

TABLE 6-continued

EVALAUTION OF VARIOUS PARTICLE SIZES

| Ingredient | Wt./Vol. (grams/mL) | % Ratio (wax/sand + wax) | Bath Temp (C) | Extrac. Time (minutes) | Time Air Dried (hours) | Free Flowing | Compressibility | Shape Sustainability | Tactility | Comments |
|---|---|---|---|---|---|---|---|---|---|---|
| Hexane | 400 | | | | | | | | | |
| Sand | 375 | | | | | | | | | |
| <150 microns fine sand: | | | | | | | | | | |
| Paraffin | 6.75 | 5 | 56 | 56 | 24 | yes | good | good | soft, pleasant | |
| Hexane | 133 | | | | | | | | | |
| Sand | 125 | | | | | | | | | |

TABLE 7

PREPARATION OF SPECIALTY FORMULATIONS

| Ingredient | Wt./Vol. (grams/mL) | % Ratio (wax/sand + wax) | Bath Temp (C) | Extrac. Time (minutes) | Time Air Dried (hours) | Free Flowing | Compress-ibility | Shape Sustainability | Tactility | Comments |
|---|---|---|---|---|---|---|---|---|---|---|
| Paraffin | 10 | | 56 | 45 | 24 | yes | yes | yes | soft/pleasant | colorfast, thermo-chromic |
| Hexane | 150 | | | | | | | | | |
| Sand | 187.5 | | | | | | | | | |
| Type 22 thermochromic pigment | 10 | | | | | | | | | |
| Paraffin | 20 | | 57 | 40 | 24 | yes | yes | yes | soft, but slightly clumpy | |
| Hexane | 350 | | | | | | | | | |
| Sand | 375 | | | | | | | | | |
| 6SSU phosphor-escent pigment | 10 | | | | | | | | | |
| Paraffin | 10 | | 68 | 60 | 24 | yes | yes | yes | soft/pleasant | glitter does not hinder performance, works well |
| Hexane | 400 | | | | | | | | | |
| Sand | 375 | | | | | | | | | |
| Glitter | 8.4 | | | | | | | | | |

As shown by the various formulations tested, the present invention has a wide variety of potential aesthetic characteristics. The invention can retain the coloration of natural sand, it can be pigmented with a variety of different pigments. Glitter can be added to provide shiny or flaky particles. Mica particles can be employed to provide a shiny appearance. The particle size can be modified to affect the tactile characteristics of the present invention. And the present invention can be made phosphorescent, fluorescent, or even thermochromic. The product initially begins as a flowable, sandy product which can be easily compressed into a self-sustaining shape such as a sand castle, broken apart and reused. This makes for limited mess and easy clean-up.

Further, since the pigment remains in the product and does not migrate to the hands of the user, it does not cause staining or discoloration problems.

The preceding has been a description of the present invention along with preferred methods of practicing the present invention.

However, the invention itself should only be defined by the appended claims wherein we claim:

1. A toy molding composition comprising an inert particulate material coated with a thin layer of a binder, said thin layer of binder comprising a wax material effective to permit said composition to be compressed from a free-flowing particulate form to a free-standing compressed form wherein said composition has a percent wax ratio of wax to wax-plus-sand on a per weight basis of from about 1.5% to about 15%.

2. The toy molding composition claimed in claim 1 wherein said particulate matter is a siliceous material.

3. The toy molding composition claimed in claim 1 wherein said particulate material is sand.

4. The toy molding composition claimed in claim 3 wherein said wax material is selected from the group consisting of vegetable wax, animal wax, polyethylene wax, polymethylene wax polyethylene glycol wax and petroleum paraffin wax.

5. The toy molding composition claimed in claim 4 wherein said wax material is microcrystalline wax.

6. The toy molding composition claimed in claim 4 wherein said binder has a melting point of at least about 100° F.

7. The toy molding composition claimed in claim 1 further comprising a pigment.

8. The toy molding composition claimed in claim 7 wherein said pigment is selected from the group consisting of phosphorescent pigments, fluorescent pigments, and thermochromic pigments.

9. The method of forming a molding composition comprising dissolving a wax binder in a solvent to form a binder solution, and blending said binder solution with an inert particulate material to thereby coat said inert particulate material with said waxy binder solution, and stripping off said solvent at a temperature greater than the melting point of said wax, wherein said composition has a percent wax ratio of wax to wax-plus-sand on a per weight basis of from about 1.5% to about 15%.

10. The method claimed in claim 9 wherein said wax binder is selected from the group consisting of paraffin wax, animal wax, polyethylene wax, polymethylene wax, polyethylene glycol wax and vegetable wax.

11. The method claimed in claim 10 further comprising heating said binder solution.

12. The method claimed in claim 9 wherein said solvent comprises an organic solvent.

13. The method claimed in claim 12 wherein said organic solvent comprises a hydrocarbon solvent.

14. The method claimed in claim 13 wherein said hydrocarbon solvent is selected from the group consisting of hexane, heptane, octane and nonane.

15. The method claimed in claim 14 comprising 27 to 50% solvent based on total weight of sand, wax and solvent.

16. The method claimed in claim 14 wherein said solvent is blended with said binder and said sand at a temperature above the softening point of said wax and below the melting point of said wax.

17. The method claimed in claim 9 wherein said particulate matter is sand.

* * * * *

UNITED STATES PATENT AND TRADEMARK OFFICE
CERTIFICATE OF CORRECTION

PATENT NO. : 5,711,795
DATED : January 27, 1998
INVENTOR(S) : James D. Browning

It is certified that error appears in the above-identified patent and that said Letters Patent is hereby corrected as shown below:

Column 3, line 37, "–56° C." should be -- ~56° C. --.

TABLE 1, heading "Compressbility" should be -- Compressibility --.

TABLE 2, heading "Compressbility" should be -- Compressibility --.

TABLE 3, heading "Compressiblity" should be -- Compressibility --.

TABLE 3, heading "Sustainability" should be -- Shape Sustainability --.

TABLE 4, heading "Compressbility" should be -- Compressibility --.

TABLE 5, under the column "Ingredient", "F5-605 purple" should be -- F5-605 purple pigment --.

Column 10, line 42. "polymethylene wax polyethylene glycol" should be -- polymethylene wax, polyethylene glycol --.

Signed and Sealed this

First Day of December, 1998

Attest:

BRUCE LEHMAN

Attesting Officer

Commissioner of Patents and Trademarks